Patented Jan. 1, 1935

1,985,937

UNITED STATES PATENT OFFICE 1,985,937

PRODUCT OF METHYLOLUREA

Martin Luther, Mannheim, Germany, assignor to I. G. Farbenindustrie Aktiengesellschaft, Frankfort-on-the-Main, Germany, a corporation of Germany No Drawing. Application March 21, 1928, Serial No. 263,590. In Germany March 22, 1927

7 Claims. (Cl. 260—3)

The present invention relates to the production of condensation products of methylolureas and polyvalent alcohols.

It has already been proposed to produce condensation products of urea and formaldehyde or of methylolureas in organic solvents.

I have found that certain organic compounds, namely the polyhydric alcohols such as glycerol, or their derivatives such as ethers or polymers, which still contain more than one active hydroxyl group do not only act as solvents in the condensation of urea and its derivatives but take part in the said reaction. The most suitable components for the purpose of the present invention are monomethylolurea or dimethylolurea or their derivatives, such as their methyl ethers, or substitution products, for example dimethylolthiourea. For the sake of brevity, these compounds, which are equivalents for the purpose of the present invention, will be referred to as methylolureas in the following.

The said condensation is accelerated by adding acid condensing agents or by working in solution of permanently weakly acid character such as comprise the range of hydrogen-ion concentrations between pH 4 and pH 7 and, preferably, in the presence of suitable buffer substances. The condensation can be performed in a few minutes by heating the mixture of a dimethylolurea and a polyhydric alcohol, which mixture is preferably maintained at a constant hydrogen-ion concentration. According to this method the process may be rendered continuous, all that is necessary being, to pass the solution or suspension of the methylolurea employed continuously through a reaction chamber maintained at a suitable temperature, which depends on the nature of the initial materials employed. The products obtained are clear viscous masses which are miscible with water.

The following examples will further illustrate the nature of the said invention which however is not limited thereto. The parts are by weight.

Example 1

A suspension of 500 parts of dimethylolurea in 700 parts of glycerine together with 20 parts of acid potassium oxalate are heated to 100° C. to 110° C. until complete dissolution is attained. By neutralizing the product obtained by means of alkali metal carbonate or hydroxid and after filtering, a very viscous, stable product is obtained which can be employed as a plasticizer for gelatin. A similar product is obtained when the dimethylolurea employed is replaced by dimethylolthiourea or by mixture of dimethylolurea with 25 per cent by weight of dimethylolthiourea.

Example 2

500 parts of dimethylolurea are stirred into a solution of 700 parts of polyglycol-ether and 20 parts of tartaric acid whereupon the mixture is heated to 100° C. for a short time. The viscous product obtained after neutralization and filtration is miscible with water in any proportion and can be favorably employed as a plasticizer for artificial masses obtained from casein.

What I claim is:

1. The process which comprises heating a mixture consisting of a polyhydric alcohol selected from the group consisting of glycerol and glycols and compounds of glycerol and glycols which contain more than one active hydroxyl group and a methylol urea of the class consisting of monomethylol urea, dimethylol urea, their methyl ethers and di-methylol thiourea, until condensation takes place and a clear viscous solution is obtained.

2. The process according to the preceding claim carried out under acid conditions.

3. The process according to claim 1 carried out in the presence of a buffer substance capable of maintaining with water a hydrogen-ion concentration of the acid range.

4. The process which comprises heating a mixture consisting of glycerol and di-methylol urea until a condensation takes place and a clear viscous solution is obtained.

5. The process according to the preceding claim carried out in the presence of a buffer substance capable of maintaining with water a hydrogen-ion concentration of the acid range.

6. Water soluble condensation products prepared according to the process of claim 1.

7. A water soluble condensation product of glycerol and di-methylol urea having properties substantially identical with those of the product resulting from the process of claim 4.

MARTIN LUTHER.